United States Patent
Bastin et al.

(10) Patent No.: US 10,174,192 B2
(45) Date of Patent: Jan. 8, 2019

(54) PVC-FREE SURFACE COVERING

(71) Applicant: TARKETT GDL S.A., Lentzxweiler (LU)

(72) Inventors: Pierre Bastin, Wiltz (LU); Victor Caldas, Wiltz (LU)

(73) Assignee: TARKETT GDL S.A., Lentzweiler (LU)

( * ) Notice: Subject to any disclaimer, the term of this patent is extended or adjusted under 35 U.S.C. 154(b) by 0 days.

(21) Appl. No.: 14/653,056

(22) PCT Filed: Dec. 20, 2013

(86) PCT No.: PCT/EP2013/077637
§ 371 (c)(1),
(2) Date: Jun. 17, 2015

(87) PCT Pub. No.: WO2014/096336
PCT Pub. Date: Jun. 26, 2014

(65) Prior Publication Data
US 2015/0329717 A1 Nov. 19, 2015

(30) Foreign Application Priority Data

Dec. 20, 2012 (EP) .................................... 12306643

(51) Int. Cl.
*C08L 53/02* (2006.01)
*C09D 133/02* (2006.01)
*C09D 153/02* (2006.01)
*C08L 23/08* (2006.01)

(52) U.S. Cl.
CPC ............ *C08L 53/02* (2013.01); *C08L 23/0869* (2013.01); *C08L 23/0876* (2013.01); *C09D 133/02* (2013.01); *C09D 153/02* (2013.01); *C08L 2205/02* (2013.01); *C08L 2207/04* (2013.01)

(58) Field of Classification Search
CPC .. C08L 53/02; C08L 23/0869; C08L 23/0876; C09D 133/02; C09D 153/02
USPC .................................................. 524/556, 425
See application file for complete search history.

(56) References Cited

U.S. PATENT DOCUMENTS

| | | | | | |
|---|---|---|---|---|---|
| 5,274,041 | A | * | 12/1993 | Yamada | ............. A63B 37/0003 260/998.14 |
| 2002/0065151 | A1 | * | 5/2002 | Ohama | ............. A63B 37/0003 473/371 |
| 2008/0053335 | A1 | * | 3/2008 | Gustafsson | ............. C08L 23/02 106/241 |
| 2011/0305886 | A1 | | 12/2011 | Phan et al. | |

FOREIGN PATENT DOCUMENTS

WO 9820197 A1 5/1998

\* cited by examiner

*Primary Examiner* — Kelechi C Egwim
(74) *Attorney, Agent, or Firm* — Pearne & Gordon LLP

(57) ABSTRACT

A PVC-free surface covering comprises at least one layer of a thermoplastic composition. The composition comprises a polymer matrix and at least one filler. The polymer matrix comprises at least one ionomer and/or at least one acid copolymer; and at least one styrenic thermoplastic polymer.

21 Claims, No Drawings

PVC-FREE SURFACE COVERING

This application is a National Stage application of PCT international application PCT/EP2013/077637, filed on Dec. 20, 2013 which claims the priority of European Patent Application No. 12306643.3 entitled "PVC-free surface covering", filed with the European Patent Office on Dec. 20, 2012, both of which are incorporated herein by reference in their entirety.

FIELD OF THE INVENTION

The present invention relates to a thermoplastic surface covering having a reduced impact on environment, in particular in that it is free of polyvinylchloride (PVC), and a process for its manufacture.

SUMMARY OF THE INVENTION

Synthetic surface coverings such as floor or wall coverings are well known. Among them, some comprise only one layer, and others comprise multiple layers. Multiple layer covering usually comprise a lower layer known as support layer, and an upper layer known as wear layer. In opposition to other polymeric sheet materials, a floor or wall covering, and the different layers of a multiple layer covering have specific properties in terms of flexibility and mechanical resistance.

Surface coverings are usually PVC-based. The manufacture, use, and disposal of PVC however pose environmental and human health hazards. In addition, PVC forms a dense smoke in case of fire, which hinders the orientation and thus poses a security risk.

Alternatives to PVC surface coverings are for example polyolefin-based or ionomer-based surface coverings.

In particular, U.S. Pat. No. 6,287,706 describes a sheet material suitable for use in or as a floor covering comprising a polyolefin resin obtained by a metallocene catalysis, and U.S. Pat. No. 5,763,501 describes a foamed layer comprising a polyolefin elastomer (POE) or polyolefin plastomer (POP).

However, these alternative materials still have limitations compared to PVC-based surface coverings, notably with regard to mechanical properties such as hardness and scratch resistance.

Ionomers are generally regarded as good candidates to replace PVC in formulations for surface coverings, as they impart good scratch and wear resistance. These favorable mechanical properties may be linked to the restricted mobility of the polymer chains, either in discrete regions formed by grouped ionic pairs called multiplets or, upon increase of the ionic content, in continuous restricted mobility regions throughout the polymer structure called ionic clusters, which may have an effect similar to the dipole-dipole interactions in PVC.

The international patent application WO 2011/063849 discloses PVC-free floor or wall covering with improved residual indentation properties which comprises a polymer matrix comprising an ionomer, a polyolefinic resin and a filler.

The international application WO 2010/136543 discloses that the presence of ionomer in a composition for producing PVC-free surface covering improves the hot tensile strength and lowers the flexibility at room temperature.

However, ionomers, besides being rather expensive, possess ionic groups which may, if present in excess, react with the mineral filler added to the formulation for surface coverings notably for rigidity.

Furthermore, when molded, for instance for the manufacture of tiles, ionomer compositions show an important shrinkage, which may carry on over several months. The shrinkage is probably due to a continuous crystallization favored by the hydrogen bonds formed between adjacent polymer chains. As the shrinkage is more significant close to the border, the consequences of poor dimensional stability are particular severe for small products such as tiles.

Technical Problem

It is thus one object of the present invention to provide a PVC-free surface covering which shows good mechanical properties, notably in terms of hardness and scratch resistance.

It is a further object of the present invention to provide such a surface covering, which has a good dimensional stability and is thus also adapted for the manufacture of small molded products such as tiles.

It is another object of the present invention to provide such a surface covering, which is compatible with mineral fillers and is thus also adapted for the manufacture of rigid and semi-rigid products.

It is yet another object of the present invention to provide a process for the manufacture of such a PVC-free surface covering.

Solution to Problem

In its most general form, the invention is based on the discovery that PVC-free ionomer-based polymers with a good hardness, scratch resistance and a satisfying dimensional stability may be obtained by replacing at least partially the ionomer by a combination of at least one acid copolymer and/or at least one styrenic thermoplastic polymer.

The present invention is thus directed to a PVC-free surface covering comprising at least one layer of a thermoplastic composition, said composition comprising:
  a polymer matrix comprising:
    (a) at least one ionomer and/or at least one acid copolymer; and
    (b) at least one styrenic thermoplastic polymer; and
  at least one filler.

According to particular embodiments of the present invention, the surface covering may comprise one or more of the following features:
  the component (a) comprises at least two ionomers;
  at least one ionomer of component (a) comprises partially neutralized acid groups;
  at least one ionomer of component (a) is a copolymer of acrylic or methacrylic acid with ethylene, wherein the acid groups are partially neutralized;
  at least one ionomer of component (a) is a terpolymer of acrylic or methacrylic acid, acrylate or methacrylate with ethylene, wherein the acid groups are partially neutralized;
  at least one acid copolymer of component (a) is a copolymer of ethylene with acrylic acid, methacrylic acid or maleic acid anhydride;
  the amount of acid or acid anhydride groups in the acid copolymer is between 0.5 and 15 wt %;
  the at least one styrenic thermoplastic polymer of component (b) is non-ionic;

the at least one styrenic thermoplastic polymer of component (b) is selected from the group consisting of SEBS (styrene-ethylene-butylene-styrene block copolymer), SEPS (styrene-ethylene-propylene-styrene block copolymer), PS, SIS (styrene-isoprene-styrene block copolymer) and SBS (styrene-butadiene-styrene block copolymer);

the component (b) comprises a styrene-ethylene-butylene-styrene block copolymer (SEBS);

the thermoplastic composition contains between 5 and 70 parts of ionomer per 100 parts of the total amount of polymers in the polymer matrix of the thermoplastic composition;

the component (a) represents between 25 and 90 parts per 100 parts of the total amount of polymers in the polymer matrix of the thermoplastic composition;

the component (b) represents between 10 and 75 parts per 100 parts of the total amount of polymers in the polymer matrix of the thermoplastic composition;

the thermoplastic composition further comprises 0.5 to 25 phr of a processing aid;

the thermoplastic composition further comprises 0.1 to 1, preferably 0.2 to 0.5 phr of an antioxidant;

the at least one filler is present in an amount between 100 and 500, notably between 200 and 400 phr, (parts per hundred part of polymer resin);

the at least one filler is selected from calcium carbonate, calcium magnesium carbonate, magnesium carbonate and their combinations;

the at least one layer is a wear layer of a mono layer or multiple layer floor covering in the form of tiles;

the PVC-free surface covering has a Shore C hardness of between 50 and 100, preferably between 55 and 95, in particular between 70 and 95, and preferably between 80 and 95.

the PVC-free surface covering has a scratch resistance of more than 800, preferably more than 1000 and in particular at least 1200 g, as measured by a sclerometer hardness tester (model "Elcometer 3092", tungsten carbide tip of 1 mm diameter); and the thermoplastic composition comprises:
10 to 70 parts of ionomer, 5 to 70 parts of acid copolymer and 10 to 80 parts of styrenic thermoplastic polymer, the total amount of the polymers being combined to 100 parts; 100 to 500, preferably 200 to 400 phr of filler, 0.5 to 25 phr of processing aid and 0.1 to 0.5 phr of an antioxidant.

DEFINITIONS

For the purpose of the present invention, an ionomer is understood as being a copolymer that comprises repeat units of electrically neutral and ionized units. Ionized units of ionomers may be in particular carboxylic acid groups that are partially neutralized with metal cations. Ionic groups, usually present in low amounts (typically less than 15 mol % of constitutional units), cause micro-phase separation of ionic domains from the continuous polymer phase and act as physical crosslinks. The result is an ionically strengthened thermoplastic with enhanced physical properties compared to conventional plastics. Ionomers are sold notably by DuPont™ under the trademark Surlyn®. Such ionomers show specific properties, notably they may respond to a high impact puncture by a shape recovery also called self-healing. This process is presently believed to occur via an elevation of the local temperature upon impact. The locally molten polymer is elastic and allows high levels of elongation, which may account for the rebounding of the polymer to its original position upon failure. Further, the presence of ionic species creates ionic domains or aggregates of restricted mobility which have effects similar to a physical crosslink. These domains may overlap to form continuous regions also referred to as ionic clusters, which may act as a second phase within the ionomer. Some order in the aggregates may be lost with increasing temperature. Upon lowering the temperature, the regions generally reorder slowly, via a relaxation process. The slow increase of order after melting and processing explains why ionomer compositions show satisfying dimension stability only after a few weeks or months after processing.

The ionic character of ionomer materials thus plays a significant role in controlling their structural nature, provides them with specific thermal characteristics and produces significantly altered mechanical properties compared to the copolymers from which they are formed.

An acid copolymer is understood as being a copolymer comprising acid groups, preferably carboxylic acid groups or carboxylic acid anhydride groups.

A thermoplastic polymer or composition melts when heated and hardens when cooled.

A non-ionic polymer is a polymer which does not contain any ionic or ionizable groups.

An elastomer is a polymer with viscoelasticity, generally having low Young's modulus and high yield strain compared with other materials. Elastomers are amorphous polymers existing above their glass transition temperature, so that considerable segmental motion is possible.

A thermoplastic elastomer (TPE), also referred to as thermoplastic rubber, is understood as being a class of copolymers or physical mix of polymers which consists of materials with both thermoplastic and elastomeric properties. Such polymers possess a microstructure which combines a continuous thermoplastic phase and a dispersed rubber phase. In contrast to thermoset elastomers, which are cross-linked by a covalent bond created during the vulcanization process, thermoplastic elastomers are cross-linked by weaker dipole or hydrogen bonds or are present only in one of the phases of the material.

A polyolefin elastomer (POE) are defined in the "Handbook of Plastics Elastomers and Composites", Charles A. Harper, $4^{th}$ edition, 2002, Mc Graw-Hill Handbooks, p. 195, and elastomer and plastomer resins may also be defined as being elastomer when the content of octene monomer is less than 20%, and as being plastomer when the content of octene monomer is more than 20%. POE have also been obtained from monomers different from octene, for instance from propylene, butene or hexene monomers.

A styrenic polymer is a polymer including or consisting of units derived from styrene. The class of styrenic polymers includes in particular PS (polystyrene), SEBS (styrene-ethylene-butylene-styrene block copolymer), SEPS (styrene-ethylene-propylene-styrene block copolymer), SIS (styrene-isoprene-styrene block copolymer), SBS (styrene-butadiene-styrene block copolymer) and styrene-ethylene-ethylene-propylene-styrene block copolymer (SEEPS).

Throughout this text, the term copolymer is intended to include terpolymers and polymers produced from more than three different comonomers, such as interpolymers.

DETAILED DESCRIPTION

The present invention relates to a PVC-free surface covering comprising at least one layer made of a thermoplastic composition comprising as main constituents a component (a) comprising a ionomer and/or an acid copolymer and a component (b) comprising a styrenic thermoplastic polymer, and furthermore at least one filler.

Indeed, it has been found that it is possible to improve dimensional stability of PVC-free surface coverings while maintaining hardness and scratch resistance even for a reduced ionic bonds content in the thermoplastic composition if a second component comprising a styrenic thermoplastic polymer is added.

According to the invention, the PVC-free floor or wall covering thus comprises at least one layer of a thermoplastic composition, said composition comprising:
a polymer matrix comprising:
(a) at least one ionomer and/or at least one acid copolymer; and
(b) at least one styrenic thermoplastic polymer; and
at least one filler.

According to the invention, the component (a) comprises at least one ionomer and/or at least one acid copolymer.

Generally, the ionomers useful in the present invention comprise no more than 15 mol %, preferably no more than 10 and in particular no more than 5 mol % of ionized groups.

Preferred ionomers include in particular polymers comprising partially neutralized acid groups as partially ionized groups. Thus, at least one ionomer of component (a) preferably comprises partially neutralized acid groups. The acid groups may be integrated into the polymer chain, for example as a copolymer or terpolymer, or grafted by a chemical modification on the polymer chain.

Advantageously, at least one ionomer of component (a) is a copolymer of acrylic or methacrylic acid with ethylene, wherein the acid groups are partially neutralized. Preferably, at least one ionomer of component (a) is a terpolymer of acrylic or methacrylic acid, acrylate or methacrylate with ethylene, wherein the acid groups are partially neutralized.

Suitable cations as counterions for ionized units of ionomers may be in particular sodium, potassium, lithium, calcium, magnesium or zinc.

Ionomers which are useful for the present invention may be manufactured as disclosed for instance in the international application WO 97/09358. Ionomers are also commercially available and sold for example by DuPont under the tradename Surlyn®, by Exxon under the trademark Iotek® or by Honeywell under the trademark AClyn®.

More specifically, the ionomer may be, for example, an ethylene-methacrylic acid copolymer wherein the acid groups are partially neutralized with zinc ions having a density of around 0.96 g/cm$^3$ and a MFI of around 1 g/10 min, or a terpolymer of ethylene, butyl-acrylate and methacrylic acid wherein the acid groups are partially neutralized with zinc ions, said terpolymer having a density of around 0.95 g/cm$^3$ and a MFI of around 0.7 g/10 min, or a low molecular weight ethylene-acrylic acid copolymer wherein the acid groups are partially neutralized with sodium ions.

Most preferred are combinations of two or more, for example three different ionomers.

The thermoplastic composition comprises preferably less than about 80 parts, preferably, between 1 to 75 parts, more preferably between 5 to 70 parts, and even more preferably between 10 to 50 parts of ionomer per 100 parts of the total amount of polymers in the polymer matrix of the thermoplastic composition.

The acid copolymers are distinct from the previously discussed ionomers in that they are not partially neutralized and thus do not contain the ionic groups required for ionomers. Accordingly, the acid copolymers do not possess the specific properties of ionomers mentioned above.

Preferred acid copolymers within the component (a) contain repeat units derived from unsaturated carboxylic acids and/or carboxylic acid anhydrides. Among these copolymers, those derived from monomer mixtures comprising acrylic acid, methacrylic acid and maleic acid anhydride (MAH) are particularly preferred.

Preferably, the acid copolymer contains between 0.5 to 15 wt % of acid or acid anhydride, preferably between 1 to 10 wt % and more preferably around 2 wt %.

Acid copolymers further may contain repeat units derived from different monomers. Preferred are copolymers that contain for example units derived from polyolefins such as ethylene or propylene.

Particularly preferred is that at least one acid copolymer of component (a) is a copolymer of ethylene with acrylic acid, methacrylic acid or maleic acid anhydride.

Acid copolymers may further contain further repeat units, notably derived from esters such as acrylic or methacrylic esters.

The acid copolymer may be, for example, a copolymer of ethylene incorporating 9 wt % of methacrylic acid monomers and having a density of around 0.93 g/cm$^3$ (Nucrel 0903® from DuPont) and a MFI of around 2.5 g/10 min or Nucrel 0910® having a MFI of around 10 g/10 min, a copolymer of ethylene incorporating around 1 wt % of maleic anhydride monomers and having a density of around 0.88 g/cm$^3$ and a MFI of around 3,7 (Fusabond 525), or a terpolymer of ethylene, acrylate and acid (Bynel® 2022 from DuPont), said terpolymer having a density of around 0.93 g/cm$^3$ and a MFI of around 35 g/10 min.

Most preferred is a component (a) comprising a combination of two or more different acid copolymers.

The component (a) may comprise up to 100 parts of acid copolymer per 100 parts of the total amount of polymer in component (a). However, it comprises preferably 40 to 95 parts of acid copolymer per 100 parts of the total amount of polymer in component (a).

The thermoplastic composition comprises preferably up to 50 parts, preferably, between 5 to 40 parts, more preferably between 10 to 30 parts, and even more preferably between 15 to 25 parts of acid copolymer with respect to the total amount of the polymers in the composition.

The component (a) preferably represents between 25 and 90 parts per 100 parts of the total amount of polymers in the thermoplastic composition.

The component (b) comprises at least one styrenic thermoplastic polymer.

Preferred such styrenic thermoplastic polymers are polystyrene and styrenic block copolymers. Among these, styrenic block copolymers are preferred. Particularly preferred are polymers which are non-ionic and thus non polar.

Examples of styrenic block copolymers are styrene-butadiene-styrene block copolymers (SBS), styrene-isoprene-styrene block copolymers (SIS), styrene-ethylene-butylene-styrene block copolymers (SEBS), styrene-ethylene-propylene-styrene block copolymers (SEPS) and styrene-ethylene-ethylene/propylene-styrene block copolymers (SEEPS). Among these, the block copolymers SBS, SIS, SEBS are preferred, SEBS being particularly preferred.

Styrenic block copolymers are available on the market and sold for instance under the trademarks Europrene (Polimeri Europa), Dryflex and Mediprene (ELASTO), Septon (Kuraray) and Kraton (Shell chemical division).

Preferably, the styrenic block copolymers used in the thermoplastic composition have a melt flow index (MFI) between 0.6 to 3.5 g/10 min at 190° C., under 5 kg weight.

Preferably, at least one styrenic thermoplastic polymer of component (b) is selected from the group consisting of SEBS, SEPS, SEEPS, PS, SIS and SBS. Among these, a styrene-ethylene-butene-styrene block copolymer (SEBS) is most preferred.

Most preferred is a component (b) comprising a combination of two or more different styrenic thermoplastic polymers, for example three styrenic thermoplastic polymers.

According to a particular embodiment of the invention, component (b) may comprise a combination of styrenic thermoplastic polymers such as styrenic block copolymers with one or more other thermoplastic polymers.

Thermoplastic polymers that may additionally be present in component (b) include in particular polyolefins, thermoplastic elastomers, poly(ethylene-vinyl acetate) (EVA), poly(ethylene-methyl acrylate) (EMA), poly(ethylene-butyl acrylate) (EBA), poly(ethylene-ethyl acrylate) (EEA), polyolefin elastomers (POE), polyolefin blends, elastomeric alloys (TPE-v or TPV), thermoplastic polyurethanes and thermoplastic copolyesters and thermoplastic polyamides.

Preferred polyolefins are polyethylene, polypropylene or copolymers thereof. Particularly preferred are copolymers of ethylene with another α-olefin monomer which comprises a percentage of ethylene above 50%.

Polyethylene based polymers are preferably VLDPE (very low density polyethylene) with a density range of 0.880-0.915 g/cm$^3$ (ASTM D792), HDPE (high density polyethylene) with a density range of 0.930 to 0.965 g/cm$^3$ (ASTM D792), polyolefin elastomers (POEs) with a density of 0.85-0.89 g/cm$^3$ (ASTM D792), LLDPE (Linear Low Density Polyethylene) having a density from 0.915 to 0.930) and POP (PolyOlefinPlastomers having a density from 0.89 to 0.92 g/cm$^3$).

Preferably, the polyolefins used in the thermoplastic composition have a melt flow index (MFI) of 0.6 to 10, preferably of 1 to 3 g/10 min at 190° C., under 2.16 kg weight.

Some or all the polyolefin polymers may be obtained by a metallocene-based catalysis.

Preferred polyolefin elastomers (POE) are copolymers of ethylene and another α-olefin monomer having from 2 to 20 carbon atoms, preferably 3 to 8 carbon atoms, diolefins and/or ethylenically unsaturated monomers, or a copolymer derived from the polymerization of two or more different monomers.

Thermoplastic compositions comprising as component (b) a combination of SEBS, SIS, SBS, SEPS or PS with HDPE, VLDPE, LLDPE, EVA or PP, are particularly preferred.

As the surface covering is to be free of PVC, PVC is however excluded. Other halogenated polymers are also preferably absent from the thermoplastic composition.

The thermoplastic composition comprised in the PVC-free surface covering finally also comprises at least one filler. The amount of filler depends in particular on the required rigidity of the surface covering.

Preferably, the at least one filler is present in an amount between 100 and 500, preferably between 200 and 400 and notably between 250 and 350 phr (parts per hundred part of polymer).

One particular advantage of the thermoplastic composition disclosed is its compatibility with a large variety of different fillers. In that respect, the at least one filler is preferably calcium carbonate or calcium magnesium carbonate, and/or magnesium carbonate. Generally, fillers forming basic aqueous solutions are suitable.

The thermoplastic composition may further comprise usual additives such as thermal or light stabilizers, antistatic additives, processing additives, the type and the quantity of these additives being adapted to the process, in particular to the type and quantity of component of the layer composition and in particular to the filler used.

Preferably, the thermoplastic composition comprises further one or more processing aids. Such processing aids may be in particular stearic acid or stearine or a mineral or synthetic oil. The oil may be in particular a processing oil, such as a naphtenic or paraffinic oil such as Plastol 545 from ExxonMobil or processing oil 6116 WOP from Petrocenter, or a synthetic oil, such as 1,2-cyclohexane dicarboxylic acid diisononyl ester (DINCH, sold by BASF under the tradename Hexamoll®), The processing aid may be added in a proportion of 0.5 to 25, preferably 0.2 to 20 and in particular 0.5 to 15 phr. Particularly preferred are compositions comprising 2 to 10 phr of stearic acid, and/or 2 to 25 phr of an oil.

The thermoplastic composition may comprise in particular 0.1 to 1, preferably 0.2 to 0.5 phr of an antioxidant such as Irganox 1010 sold by BASF.

In order to allow for the manufacture of surface coverings, in particular floor and wall coverings with multi-colored designs, the thermoplastic composition may further comprise coloring agents such as pigments.

According to a particularly preferred embodiment of the invention, the thermoplastic composition comprises:

10 to 70 parts of ionomer, 5 to 70 parts of acid copolymer and 10 to 80, preferably 20 to 50 parts of styrenic thermoplastic polymer, the total amount of the polymers being combined to 100 parts; 100 to 500, preferably 200 to 400 phr of filler, 0.5 to 25 phr of a processing aid and 0.1 to 0.5 phr of an antioxidant.

The thermoplastic composition disclosed above may be manufactured using convention equipment and procedures. In particular, the polymers may be compounds at a temperature exceeding the melting temperature of the polymeric ingredients with the additives and filler using an appropriate mixer. The temperature is generally comprised between 150 and 230° C. After an optional further mixing step, notably to include coloring agents to impart color to the thermoplastic composition, the resulting mixture may be granulated.

The thermoplastic composition disclosed above may be used in particular to manufacture a PVC-free surface covering which may comprise one or more layers. The covering may be notably in form of rolls or tiles.

The favorable shrinkage characteristics render its use for the manufacture of tiles especially interesting.

The good hardness and scratch resistance renders the thermoplastic composition particularly useful for the manufacture of a wear layer of a single or multiple layer floor covering. According to a preferred embodiment of the invention, the thermoplastic composition is used for the wear layer of a multiple layer floor covering in the form of tiles or rolls.

As discussed above, the PVC-free surface covering according to the invention has excellent mechanical properties, notably in terms of hardness and scratch resistance and shows a very low to absent shrinkage upon molding.

Preferably, the covering shows a Shore C hardness of between 50 and 100, preferably between 55 and 95 and most preferred between 80 and 95.

Advantageously, the PVC-free surface covering has a scratch resistance of more than 800, preferably more than 1000 and in particular at least 1200 g, as measured by a sclerometer hardness tester (model "Elcometer 3092" using a 1 mm tungsten carbide tip).

The surface covering according to the present invention may be produced from the thermoplastic composition described above by any suitable process, for example by calendering, extrusion or melt extrusion.

The PVC-free surface covering may be manufactured by known processes and do not require modifications of conventional equipment.

According to a further aspect of the invention, a process for the manufacture of said PVC-free surface covering comprises the steps consisting in:
  (a) compounding the polymers with the filler and optional additives in a suitable mixer, at a temperature above the melting temperature of the polymers;
  (b) optionally further mixing with suitable coloring agents;
  (c) granulating the compounded mixture obtained;
  (d) melting the granulated compounded mixture obtained;
  (e) pressing the molten granulated compounded mixture into a film;
  (f) cooling the film obtained; and
  (g) rolling the film into rolls and optionally cutting tiles from the film.

In step (a), any conventional mixer can be used, for instance in a continuous mixer such as a twin screws compounding extruder or a Farrel Continuous Mixer, also called "FCM", from Farrel® Company. In the alternative, a discontinuous mixer such as an internal mixer may also be used. The temperature used for melting the polymers is generally comprised between 150 and 230° C.

In step (b), any conventional mixer can be used, for instance an external mixer. The granulating step (c) is carried out in conventional equipment well-known by the skilled person.

In step (e), the film thickness may vary for instance between 0.5 to 10 mm, and is preferably around 2 mm and the width of the film may vary for instance between 10 inches to 2 m.

EXAMPLES

Unless indicated to the contrary, the polymers represent all together 100 parts and the additional ingredients of the thermoplastic composition are given in parts per hundred part of polymer resins (phr). Throughout this text, all proportions are given in parts or percentage by weight, unless indicated to the contrary. Furthermore, the melt flow index (MFI) is, unless indicated to the contrary, measured at 190° C. and 2.16 kg.

Comparative Examples A and B

PVC-free Thermoplastic Film Based on Ionomer Alone

Ionomers are known to improve the hardness and scratch resistance of a film. Therefore, compositions based on ionomers were prepared as comparative examples.

Table 1 below indicates polymers used for each composition and their respective proportions in the compositions.

The terpolymer ionomer Surlyn® S 9020 from DuPont comprises ethylene, acrylate and methacrylic acid monomers partially neutralized with Zn ions having a density of 0.96 g/cm³ and an MFI of 1 g/10 min.

The copolymer ionomer Surlyn® S 1706 from DuPont comprises ethylene, and methacrylic acid monomers partially neutralized with Zn ions having a density of 0.95 g/cm³ and an MFI of 0.7 g/10 min.

The ionomer is compounded at a temperature of around 150° C. with 375 phr of filler (calcium carbonate VS 35 from Omya), 5 phr of stearic acid (Radiacid 444 from Oleon) and 0.5 phr of antioxidant Irganox 1010 from BASF using a twin screws compounding extruder. The mixture is then calendered at a working temperature of around 150° C. using a suitable calendering device to give a 2 mm thick film.

The films obtained are characterized in terms of hardness, scratch resistance and shrinking behavior using the test procedures set out below.

TABLE 1

Composition of the thermoplastic compositions according to the comparative examples A to F

| Example | Ionomer [phr] Surlyn S9020 | Ionomer [phr] Surlyn S1706 | SEBS [phr] Eur 2311 | HDPE [phr] CI CL 508 | POE [phr] Taf DF 710 |
|---|---|---|---|---|---|
| A | 100 | — | — | — | — |
| B | — | 100 | — | — | — |
| C | — | — | 60 | 40 | — |
| D | — | — | 100 | — | — |
| E | — | — | — | — | 100 |
| F | — | — | — | 100 | — |

Comparative Examples C and D

PVC-free Thermoplastic Film Based on Styrenic Polymers Alone

Thermoplastic polymers such as styrenic polymers may improve shrinkage resistance of a layer as they contain few or no ionic sites that cause slow shrinkage due to ionic cluster rearrangement.

Therefore, compositions based on two different such polymers were prepared as comparative examples. Table 1 above indicates the polymer used for each composition and their respective proportion.

Comparative example C is based on a combination of SEBS and HDPE and comparative example D is based on a styrene-ethylene-butylene-styrene block copolymer (SEBS) alone.

Further to the polymers specified in the preceding examples:

Europrene® 2311 (from Polimeri Europa) is a styrene-ethylene-butylene-styrene block copolymer (SEBS) having 30% of styrene content and a MFI of 2 g/10 min (at 190° C. and 5 kg).

Clearflex® CL 508 (from Polimeri Europa) is an octene copolymer linear high density polyethylene (C8-HDPE) having a density of 0.935 g/cm³ and an MFI of 3 g/10 min.

The polymers are compounded and transformed into a film as set out in the protocol indicated in Example A, using the same filler and additives in the same proportions.

The films obtained are characterized in terms of hardness, scratch resistance and shrinking behavior using the test procedures set out below.

Comparative Examples E and F

PVC-free Thermoplastic Film Based on Polyolefins Alone

Thermoplastic polymers such as polyolefins may improve shrinkage resistance of a layer as they contain few or no ionic sites that cause slowly shrinkage due to ionic clusters rearrangement.

Therefore, compositions based on two different such polymers were prepared as comparative examples. Table 1 above indicates polymer used for each composition and their respective proportion.

Comparative example E is based on a polyolefinic elastomer (POE) and comparative example F is based on a linear high density polyethylene (C8-HDPE).

Further to the polymers specified in the preceding examples:

Tafmer® DF 710 (from Mitsui Chemicals) is an ethylene based polyolefin elastomer (POE) having a density of 0.87 g/cm$^3$ and an MFI of 1 g/10 min.

The polymers are compounded and transformed into a film as set out in the protocol indicated in Example A, using the same filler and additives in the same proportions.

The films obtained are characterized in terms of hardness, scratch resistance and shrinking behavior using the test procedures set out below.

Examples 1 to 6

PVC-free surface covering having a Shore C hardness of around 88

According to the invention, thermoplastic compositions were prepared wherein the ionomer was at least partly replaced by an acid copolymer and/or a styrenic thermoplastic polymer.

Table 2 below indicates the polymers used for each composition and their respective proportions.

Further to the polymers specified in the preceding examples:

Nucrel® 0910 from DuPont is a copolymer of ethylene and around 9% methacrylic acid having and a MFI of 10 g/10 min.

Fusabond® 525 from DuPont is an elastomer, obtained by a metallocene-based catalysis, and comprising around 1% of maleic anhydride. F525 has a density of 0.88 g/cm$^3$, a MFI of 3.7 g/10 min.

Europrene® 6306 (from Polimeri Europa) is a styrene-butadiene block copolymer (SBS) containing 37% bound styrene and a Brookfield viscosity of around 22000 cps measured in toluene solution containing 25% by weight Europrene.

Europrene® 161 (from Polimeri Europa) is a styrene-butadiene block copolymer (SBS) containing 30% bound styrene having a Brookfield viscosity of around 20000 cps measured in toluene solution containing 25% by weight Europrene.

Europrene® 193 A (from Polimeri Europa) is a styrene-isoprene block copolymer (SIS) containing 25% bound styrene and having a MFI of 3 g/10 min at 190° C. and 5 kg.

The polymers are compounded and transformed into a film as set out in the protocol indicated in Example A, using the same filler and additives in the same proportions.

The films obtained are characterized in terms of hardness, scratch resistance and shrinking behavior using the test procedures set out below.

Examples 7 to 12

PVC-free Thermoplastic Films with Variable Ionomer Content

In order to evaluate the relationship between ionomer content and shrinkage, thermoplastic compositions were prepared wherein the ionomer was progressively replaced by an acid copolymer and/or a styrenic thermoplastic polymer.

Table 3 below indicates the polymers used for each composition and their respective proportions.

Further to the polymers specified in the preceding examples:

Iotek 7010 is an ionomer from ExxonMobil. It is derived from an ethylene-acrylic acid copolymer having 15 wt % of acrylic acid. The MFI before neutralization is 35 g/10 min (190° C. and 2.16 kg). The anionic groups are neutralized with Zn$^{++}$ cations. After neutralization, the final MFI is around 1 g/10 min (190° C. and 2.16 kg).

Iotek 4200 is derived from an ethylene copolymer containing around 10 wt % of acrylic acid and has a final MFI of 3 g/10 min (190° C. and 2.16 kg).

TABLE 2

Polymer composition of examples 1-6

| Example | Ionomers [phr] | | Acid Copolymers [phr] | | Styrenic thermoplastic polymers [phr] | | | Other thermoplastic polymers [phr] | |
|---|---|---|---|---|---|---|---|---|---|
| | Surlyn S9020 | Surlyn S1706 | Copolymer ethylene-acid (Nucrel 0910) | Grafted polyolefin (Fusabond 525) | SEBS (Europrene 2311) | SBS (Europrene 6306) | SIS (Europrene 193 A) | HDPE (Clearflex CL 508) | POE (Taf DF 710) |
| 1 | — | 50 | — | 10 | 40 | — | — | — | — |
| 2 | 20 | 20 | 10 | 10 | 30 | — | — | 10 | — |
| 3 | 20 | 20 | 10 | 10 | — | 30 | — | 10 | — |
| 4 | 20 | 20 | 10 | 10 | — | 30* | — | 10 | — |
| 5 | 20 | 20 | 10 | 10 | 15 | — | — | 10 | 15 |
| 6 | 20 | 20 | 10 | 10 | — | — | 30 | 10 | — |

*SBS Europrene ® 161

TABLE 3

Polymer composition of examples 7-12

| | Ionomers [phr] | | Acid Copolymers [phr] | | Styrenic thermoplastic polymers [phr] SEBS | Thermoplastic polymers [phr] HDPE |
| | | | Copolymer ethylene - acid | Grafted polyolefin | | |
| Example | Iotek 7010 | Iotek 4200 | (Nucrel 0910) | (Fusabond 525) | (Europrene 2311) | (Clearflex CL 508) |
|---|---|---|---|---|---|---|
| 7 | 100 | — | — | — | — | — |
| 8 | 50 | — | — | 15 | 15 | 20 |
| 9 | 70 | — | — | 10 | 10 | 10 |
| 10 | — | 100 | — | — | — | — |
| 11 | — | 50 | 15 | — | 15 | 20 |
| 12 | — | 70 | 10 | — | 10 | 10 |

Examples 13 to 22

PVC-free Thermoplastic Films Having a Shore C Hardness of Around 92

Thermoplastic compositions were prepared wherein the ionomer was at least partly replaced by an acid copolymer and/or a styrenic thermoplastic polymer.

Table 4 below indicates the polymer used for each composition and their respective proportions.

Further to the polymers specified in the preceding examples:

Bynel® 2022 (from DuPont) is an acid modified ethylene-acrylate terpolymer having a density of 0.93 g/cm³ and an MFI of 35 g/10 min.

Clearflex® MPDO (from Polimeri Europa) is a VLDPE having a density of 0.9 g/cm³ and an MFI of 7 g/10 min.

Styron 648-PC (from Styron LLC) is a polystyrene having a density of 1.05 g/cm³ and an MFI of 1.3 g/10 min as measured at 200° C. and at 5 kg.

The polymers are compounded and transformed into a film as set out in the protocol indicated in Example A, using the same filler and additives in the same proportions.

The films obtained are characterized in terms of hardness, scratch resistance and shrinking behavior using the test procedures set out below.

Examples 23 to 25

PVC-free Surface Coverings Further Containing Polypropylene or Polystyrene

According to the invention, thermoplastic compositions were prepared wherein the ionomer was at least partly replaced by an acid copolymer and a styrenic thermoplastic polymer in combination with polypropylene or polystyrene.

Table 4 below indicates the proportion and polymer used for each composition and the additives.

Further to the polymers specified in the preceding examples:

Braskem PP C7056-03 sold by Braskem is a polypropylene having a density of 0.900 g/cm³ and an MFI of 3.5 g/10 min at 230° C. and at 2.16 kg.

The polymers are compounded and transformed into a film as set out in the protocol indicated in Example A, using the same filler and additives in the same proportions.

The films obtained are characterized in terms of hardness, scratch resistance and shrinking behavior using the test procedures set out below.

TABLE 4

Polymer composition of examples 13-25

| | Ionomers [phr] | | | Acid Copolymers [phr] | | | Styrenic polymers [phr] | | Polyolefins [phr] | | |
| | | | | Copolymer ethylene-acid | Terpolymer acid (Bynel 2022) | Grafted poly-olefin | | | | | |
| Example | S9020 | S1706 | AClyn 285 | | | | SEBS | PS | HDPE | VLDPE | PP |
|---|---|---|---|---|---|---|---|---|---|---|---|
| 13 | 20 | 25 | 10 | — | — | 5 | 30 | — | 10 | — | 0 |
| 14 | — | 40 | — | — | 10 | 10 | 30 | — | 10 | — | 0 |
| 15 | — | 25 | — | 25 | — | 10 | 20 | — | 20 | — | 0 |
| 16 | — | 30 | — | — | — | 10 | 20 | — | 40 | — | 0 |
| 17 | — | 30 | — | 20 | — | 10 | 20 | — | — | 20 | — |
| 18 | — | 40 | — | 10 | — | 10 | 30 | — | 10 | — | 0 |
| 19 | — | 25 | 10 | 25 | — | — | 20 | — | 20 | — | 0 |
| 20 | — | 15 | — | 15 | — | 10 | 25 | 35 | — | — | — |
| 21 | — | 10 | — | 10 | — | 10 | 20 | 50 | — | — | — |
| 22 | 20 | 20 | — | — | — | -0 | 20 | 40 | — | — | — |
| 23 | — | 25 | — | 25 | — | 10 | 20 | — | — | — | 20 |
| 24 | — | 25 | — | 25 | — | 10 | 20 | 20 | — | — | — |
| 25 | 20 | 20 | — | 10 | — | 10 | 10 | — | 30 | — | — |

TABLE 5

Polymer composition of examples 26-31

| | Ionomers [phr] | | Acid Copolymers [phr] | | Styrenic thermoplastic polymers [phr] | | Other thermoplastic polymers [phr] | Filler [phr] | |
|---|---|---|---|---|---|---|---|---|---|
| | | | Copolymer ethylene - acid | Grafted polyolefin | SEBS | PS | HDPE | Calcium | Calcium-magnesium |
| Example | Surlyn S9020 | Surlyn S1706 | (Nucrel 0910) | (Fusabond 525) | (Europrene 2311) | (Styron 648-PC) | (Clearflex CL 508) | carbonate (VS 35) | carbonate (DRB 4/15) |
| 26 | 12.5 | 30 | 17.5 | 10 | 17.5 | 12.5 | — | 150 | — |
| 27 | — | 30 | 25 | 10 | 15 | — | 20 | 500 | — |
| 28 | 12.5 | 30 | 17.5 | 10 | 17.5 | 12.5 | — | 100 | — |
| 29 | 25 | — | 10 | 5 | 45 | 15 | — | 100 | — |
| 30 | 25 | — | 10 | 5 | 45 | 15 | — | — | 100 |
| 31 | 30 | — | 10 | 5 | 55 | — | — | — | 100 |

Examples 26 to 31

PVC-free Surface Coverings with Different Fillers

According to the invention, thermoplastic compositions were prepared wherein the ionomer was at least partly replaced by an acid copolymer and a styrenic thermoplastic polymer in combination with polypropylene or polystyrene.

Table 5 above indicates the proportion and polymer used for each composition and the additives.

Further to the filler specified in the preceding examples: VS 35 is a calcium carbonate sold by Omya. DRB 4/15 is a calcium/magnesium carbonate sold by Imerys.

The polymers are compounded and transformed into a film as set out in the protocol indicated in Example A, using the same filler in the same proportions. With regard to additives, the ionomer is compounded with 0.5 phr of stearin and 2 phr of processing oil (PO 6116 WOP from Petrocenter) except for Example 27, where 3 phr of stearic acid and 10 phr of 1,2-Cyclohexane dicarboxylic acid diisononyl ester (Hexamoll DINCH from BASF) was added.

The films obtained are characterized in terms of hardness, scratch resistance and shrinking behavior using the test procedures set out below.

[Evaluation of the Mechanical Properties]

The films prepared in the examples were characterized in terms of hardness, scratch resistance and shrinkage using the test procedures set out below.

a. Hardness

The hardness of the surface covering is measured according to DIN 53505 using a durometer which measures the indentation of the sample surface left by a tip having a specific geometry and dimension applied with a predetermined force, 10 seconds after applying the force.

The sample comprises three superposed layers and has a total thickness of 6 mm.

Considering the range of hardness of the floor or wall covering according to the invention, the Shore C scale has proven to be adapted best.

b. Scratch Resistance

The scratch resistance is measured by a Sclerometer Durometer Elcometer 3092® from Elcometer®.

The body of the instrument contains a round tip, compressed by one of the three springs corresponding to the three printed scales: 0-300, 0-1000, 0-2000 g, and a cursor fitted with a screw lock. By making short, straight movements while gradually increasing the load, the user can observe the force at which the tip leaves a mark or destroys the surface. The tip is made of silicon carbide and has a diameter of 1 mm.

The thickness of the surface evaluated to scratch is 2 mm.

c. Shrinkage

The shrinkage behavior of the thermoplastic formulations was evaluated using the following test.

Sample tiles with dimensions of 12 inch×12 inch were cut after production from the sheet obtained in the examples. One surface of the tiles was dusted with calcium carbonate to allow for sliding.

Then, the samples were introduced into an oven heated to a temperature of 90° C. for around 3 minutes in order to relieve the mechanical stress. The sample tiles were then transferred onto a glass support and introduced into water at a temperature of 20° C. After 5 minutes, the samples were retrieved from the water, dried and slightly cut in form.

The dry samples recovered were then marked at around 2.5 inch of the border in the machine direction (longitudinal direction) and in the direction orthogonal thereto (transversal direction) and the distance therebetween was measured with precision.

The marked samples were then left on a flat surface at a temperature of 23±2° C. (50% RH) for at least 14 days and at most 21 days before repeating the measurement of the distance between the markings close to the border.

The shrinkage is determined by the mean value of the difference in distance and is expressed in mil (a thousandth of inch). The shrinkage values were then classified into five levels, as set out in the table 6 below.

TABLE 6

Shrinkage levels

| | Shrinkage Level | | | | |
|---|---|---|---|---|---|
| | Very high | High | Medium | Low | Very low |
| Shrinkage interval value | >20 mils | 15-20 mils | 10-15 mils | 5-10 mils | <5 mils |

TABLE 7

Mechanical properties of comparative examples

| Example | Hardness Shore C | Scratch resistance [g] | Shrinkage [mils] |
|---|---|---|---|
| A | 87 | 800 | High |
| B | 94 | 1200 | High |

TABLE 7-continued

Mechanical properties of comparative examples

| Example | Hardness Shore C | Scratch resistance [g] | Shrinkage [mils] |
| --- | --- | --- | --- |
| C | 85 | 250 | Very low |
| D | 76 | 200 | Very low |
| E | ND | 450 | Very low |
| F | ND | 200 | Very low |

The results of the assessments of the mechanical properties for the films of comparative examples A to F are given in table 7 above. These results clearly show that compositions based on ionomers alone (examples A and B) have a satisfactory hardness and scratch resistance but show important shrinkage. The films of comparative examples C to F containing only thermoplastic elastomers or PEND or blends of thermoplastic elastomers and PEND show a low shrinkage, but are not satisfactory with regard to hardness and scratch resistance.

The results of the assessments for the films of examples 1 to 6 according to the invention, containing both an ionomer and/or an acid copolymer and a styrenic thermoplastic polymer are given in table 8 below. The results demonstrate that the compositions according to the invention show a good hardness and scratch resistance in combination with very low shrinkage.

The results of the assessments for the films of examples 7 to 12 containing two different ionomers (examples 7 and 10) which are progressively replaced by an acid copolymer and a styrene-ethylene-butadiene styrene block copolymer are given in table 9 below. According to these results, the shrinkage is halved if the ionomer content is reduced by 30% (see examples 9 and 12). On the basis of this surprising result, even a limited reduction of ionomer content in the thermoplastic composition may be sufficient to reduce notably the shrinkage.

TABLE 8

Mechanical properties of the thermoplastic films of examples 1-6

| Example | Hardness Shore C | Scratch resistance [g] | Shrinkage [mils] |
| --- | --- | --- | --- |
| 1 | 88 | 1200 | Low |
| 2 | 88 | 1350 | Very low |
| 3 | 88 | 1200 | Very low |
| 4 | 87 | 1350 | Very low |
| 5 | 86 | 1350 | Very low |
| 6 | 86 | 1350 | Very low |

The results of the assessments for the films of the examples 13 to 31 containing a ionomer, a styrenic thermoplastic polymer and optionally other thermoplastic polymers are given in table 10 below.

The results confirm that compositions having a low ionomer content according to the invention may show simultaneously a good scratch resistance and a low to very low shrinkage.

It is also demonstrated that the compositions according to the invention allow access to compositions having a hardness which may vary within an extended range along with good abrasion and shrinkage properties. Examples 26 and 27 further show that different levels of filler may be used without altering the properties of the film. Example 30 and 31 show that different fillers may be used. Example 27 also demonstrates that the introduction of a processing aid such as a plasticizer does not affect the properties of the film.

TABLE 9

Properties of the thermoplastic films of examples 7-12

| Example | Ionomer reduction [%] | Shrinkage [mils] |
| --- | --- | --- |
| 7 | 0 | 18 |
| 8 | 50 | 5 |
| 9 | 30 | 8 |
| 10 | 0 | 8.5 |
| 11 | 50 | 2.5 |
| 12 | 30 | 4.5 |

TABLE 10

Mechanical properties of the thermoplastic films of examples 13-31

| Example | Hardness Shore C | Scratch resistance [g] | Shrinkage [mils] |
| --- | --- | --- | --- |
| 13 | 93 | 1200 | Low |
| 14 | 95 | 1200 | Very low |
| 15 | 92 | 1200 | Very low |
| 16 | 92 | 1200 | Very low |
| 17 | 92 | 900 | Very low |
| 18 | 93 | 1200 | Very low |
| 19 | 91 | 1050 | Very low |
| 20 | 93 | 1500 | Very low |
| 21 | 93 | 1050 | Very low |
| 22 | 93 | 1200 | Very low |
| 23 | 91 | 1350 | Very low |
| 24 | 91 | 1350 | Very low |
| 25 | 90 | 1200 | Very low |
| 26 | 84 | 1650 | Low |
| 27 | 90 | 1200 | Very low |
| 28 | 77 | 1500 | Low |
| 29 | 68 | 1200 | Low |
| 30 | 62 | 1050 | Low |
| 31 | 56 | 1200 | Low |

The different examples above show that the invention provides for thermoplastic compositions useful for the manufacture of for PVC-free surface coverings which have a reduced shrinkage while still showing excellent mechanical properties. The Shore C hardness of the surface coverings prepared may vary from 56 to 95.

Indeed, the partial replacement of ionomers by acid copolymers and thermoplastic polymers, notably thermoplastic elastomers, improves considerably the shrinkage in comparison while still maintaining very good values for hardness and scratch resistance.

Moreover, as ionomers are substantially more expensive than the other polymers used, the PVC-free surface coverings according to the invention provide a possibility to meet contradictory requirements such as an extended range of hardness, high abrasion resistance, low to very low shrinkage while maintaining a low material price.

The invention claimed is:

1. A PVC-free surface covering comprising at least one layer of a thermoplastic composition, said composition comprising:
   a polymer matrix comprising:
   (a) an ionomer comprising repetitive units of electrically neutral and ionized units, wherein the ionized units are carboxylic acid groups that are partially neutralized with metal cations, and an acid copolymer comprising acid groups, wherein the ionomer and the acid copolymer are different compounds; and (b) at least one styrenic thermoplastic polymer; and at least one filler.

2. The PVC-free thermoplastic surface covering according to claim 1, wherein the component (a) comprises at least two ionomers.

3. The PVC-free thermoplastic surface covering according to claim 1, wherein the ionomer is a copolymer of acrylic or methacrylic acid with ethylene, wherein the acid groups are partially neutralized.

4. The PVC-free thermoplastic surface covering according to claim 1, wherein the ionomer is a terpolymer of acrylic or methacrylic acid, acrylate or methacrylate with ethylene, wherein the acid groups are partially neutralized.

5. The PVC-free thermoplastic surface covering according to claim 1, wherein the acid copolymer is a copolymer of ethylene with acrylic acid, methacrylic acid or maleic acid anhydride.

6. The PVC-free thermoplastic surface covering according to claim 1, wherein the amount of acid or acid anhydride groups in the acid copolymer is between 0.5 and 15 wt%.

7. The PVC-free thermoplastic surface covering according to claim 1, wherein the at least one thermoplastic polymer of component (b) is selected from the group consisting of SEBS (styrene-ethylene-butylene-styrene block copolymer), SEPS (styrene-ethylene-propylene-styrene block copolymer), SEEPS (styrene-ethylene-ethylene-propylene-styrene block copolymer), PS, SIS (styrene-isoprene-styrene block copolymer), SBS (styrene-butadiene-styrene block copolymer).

8. The PVC-free thermoplastic surface covering according to claim 1, the component (b) comprises a styrene-ethylene-butylene-styrene block copolymer (SEBS).

9. The PVC-free thermoplastic surface covering according to claim 1, wherein the thermoplastic composition contains between 5 and 70 parts of ionomer per 100 parts of the total amount of polymers in the polymer matrix of the thermoplastic composition.

10. The PVC-free thermoplastic surface covering according to claim 1, wherein the component (a) represents between 25 and 90 parts per 100 parts of the total amount of polymers in the polymer matrix of the thermoplastic composition.

11. The PVC-free thermoplastic surface covering according to claim 1, wherein the component (b) represents between 10 and 75 parts per 100 parts of the total amount of polymers in the polymer matrix of the thermoplastic composition.

12. The PVC-free thermoplastic surface covering according to claim 1, wherein the thermoplastic composition further comprises 0.5 to 25 phr of one or more processing aids.

13. The PVC-free thermoplastic surface covering according to claim 1, wherein the thermoplastic composition further comprises 0.1 to 1 phr of an antioxidant.

14. The PVC-free thermoplastic surface covering according to claim 1, wherein the at least one filler is present in an amount between 100 and 500 phr.

15. The PVC-free thermoplastic surface covering according to claim 1, wherein the at least one filler is selected from calcium carbonate, calcium magnesium carbonate, magnesium carbonate and their combinations.

16. The PVC-free thermoplastic surface covering according to claim 1, wherein the at least one layer is a wear layer of a single or multiple layer floor or wall covering in the form of tiles or rolls.

17. The PVC-free thermoplastic surface covering according to claim 1, wherein the PVC-free covering has a Shore C hardness of between 55 and 95.

18. The PVC-free thermoplastic surface covering according to claim 1, wherein the PVC-free covering has a scratch resistance, as measured by a sclerometer hardness tester, of more than 800 g.

19. The PVC-free thermoplastic surface covering according to claim 1, wherein the thermoplastic composition comprises:
   10 to 70 parts of the ionomer, 5 to 70 parts of the acid copolymer and 10 to 80 parts of styrenic thermoplastic polymer, the total amount of the polymers being combined to 100 parts; 100 to 500 phr of filler, 0.5 to 25 phr of processing aid and 0.2 to 0.5 phr of an antioxidant.

20. The PVC-free thermoplastic surface covering according to claim 1, wherein acid groups of the acid copolymer are carboxylic acid groups or carboxylic acid anhydride groups.

21. The PVC-free thermoplastic surface covering according to claim 19, wherein the thermoplastic composition comprises 200 to 400 phr of filler.

* * * * *

UNITED STATES PATENT AND TRADEMARK OFFICE
CERTIFICATE OF CORRECTION

PATENT NO. : 10,174,192 B2
APPLICATION NO. : 14/653056
DATED : January 8, 2019
INVENTOR(S) : Pierre Bastin and Victor Caldas Page 1 of 1

It is certified that error appears in the above-identified patent and that said Letters Patent is hereby corrected as shown below:

On the Title Page

Item (71) Applicant: TARKETT GDL S.A., "Lentzxweiler (LU)" should read -- Lentzweiler (LU) --

Signed and Sealed this
Second Day of July, 2019

Andrei Iancu
*Director of the United States Patent and Trademark Office*